(12) United States Patent
Miyamoto et al.

(10) Patent No.: US 9,650,550 B2
(45) Date of Patent: *May 16, 2017

(54) POLYIMIDE PRECURSOR COMPOSITION, METHOD OF PRODUCING POLYIMIDE PRECURSOR COMPOSITION, METHOD OF PRODUCING POLYIMIDE MOLDED ARTICLE, POLYIMIDE MOLDED ARTICLE, LIQUID CRYSTAL ALIGNMENT FILM, PASSIVATION FILM, WIRE COATING MATERIAL, AND ADHESIVE FILM

(71) Applicant: FUJI XEROX CO., LTD., Tokyo (JP)

(72) Inventors: Tsuyoshi Miyamoto, Kanagawa (JP); Kana Miyazaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,229

(22) Filed: Apr. 28, 2014

(65) Prior Publication Data

US 2015/0166729 A1 Jun. 18, 2015

(30) Foreign Application Priority Data

Dec. 16, 2013 (JP) ................................ 2013-259408

(51) Int. Cl.
| | | |
|---|---|---|
| C08G 73/00 | (2006.01) | |
| C09J 7/00 | (2006.01) | |
| C09J 179/08 | (2006.01) | |
| H01B 3/30 | (2006.01) | |
| C09K 19/56 | (2006.01) | |
| C09D 179/08 | (2006.01) | |
| C08G 73/10 | (2006.01) | |
| G02B 1/04 | (2006.01) | |

(52) U.S. Cl.
CPC .......... *C09J 179/08* (2013.01); *C08G 73/105* (2013.01); *C08G 73/1067* (2013.01); *C08G 73/1071* (2013.01); *C09D 179/08* (2013.01); *C09K 19/56* (2013.01); *H01B 3/306* (2013.01); *C09J 2479/08* (2013.01); *G02B 1/04* (2013.01)

(58) Field of Classification Search
None
See application file for complete search history.

(56) References Cited

U.S. PATENT DOCUMENTS

| 4,238,528 A | 12/1980 | Angelo et al. |
| 5,719,253 A | 2/1998 | Echigo et al. |
| 2002/0151234 A1 | 10/2002 | Ozawa et al. |
| 2006/0057916 A1 | 3/2006 | Ozawa et al. |
| 2013/0171520 A1 | 7/2013 | Nakayama et al. |
| 2014/0213723 A1* | 7/2014 | Miyamoto ........... C08K 5/1575 524/754 |

FOREIGN PATENT DOCUMENTS

| JP | S45-040673 | 12/1970 |
| JP | A-8-15519 | 1/1996 |
| JP | A-8-59832 | 3/1996 |
| JP | A-8-120077 | 5/1996 |
| JP | A-8-157599 | 6/1996 |
| JP | A-2002-226582 | 8/2002 |
| JP | A-2003-13351 | 1/2003 |
| JP | A-2003-193398 | 7/2003 |
| JP | A-2012-36382 | 2/2012 |
| JP | A-2012-140582 | 7/2012 |
| TW | 201339204 A | 10/2013 |

OTHER PUBLICATIONS

Feb. 3, 2015 Office Action issued in Japanese Application No. 2014-248064.
Scroog, "Polyimides" *Journal of Polymer Science*, 1976, vol. 11, pp. 161-208.
Feb. 13, 2017 Office Action issued in Chinese Application No. 201410253223.9.

* cited by examiner

*Primary Examiner* — Ana Woodward
(74) *Attorney, Agent, or Firm* — Oliff PLC

(57) ABSTRACT

A polyimide precursor composition includes a resin having a repeating unit represented by the following Formula (I) and having an imidization ratio equal to or less than 0.2, a cyclic amine compound, and an acyclic aliphatic amine compound, wherein the resin, the cyclic amine compound, and the acyclic aliphatic amine compound are dissolved in an aqueous solvent:

$$\left( \begin{array}{c} HOOC \diagdown A \diagup C-N-B \\ N-C \diagup \diagdown COOH \\ H \quad O \end{array} \right) \quad (I)$$

wherein in Formula (I), A represents a tetravalent organic group and B represents a divalent organic group.

13 Claims, No Drawings

POLYIMIDE PRECURSOR COMPOSITION, METHOD OF PRODUCING POLYIMIDE PRECURSOR COMPOSITION, METHOD OF PRODUCING POLYIMIDE MOLDED ARTICLE, POLYIMIDE MOLDED ARTICLE, LIQUID CRYSTAL ALIGNMENT FILM, PASSIVATION FILM, WIRE COATING MATERIAL, AND ADHESIVE FILM

CROSS-REFERENCE TO RELATED APPLICATIONS

This application is based on and claims priority under 35 USC 119 from Japanese Patent Application No. 2013-259408 filed Dec. 16, 2013.

BACKGROUND

1. Technical Field

The present invention relates to a polyimide precursor composition, a method of producing a polyimide precursor composition, a method of producing a polyimide molded article, a polyimide molded article, a liquid crystal alignment film, a passivation film, a wire coating material, and an adhesive film.

2. Related Art

A polyimide resin is a material having excellent heat resistance properties and high durability, and is widely used for electronic materials.

SUMMARY

According to an aspect of the invention, there is provided a polyimide precursor composition including a resin having a repeating unit represented by the following Formula (I) and having an imidization ratio equal to or less than 0.2, a cyclic amine compound, and an acyclic aliphatic amine compound, wherein the resin, the cyclic amine compound, and the acyclic aliphatic amine compound are dissolved in an aqueous solvent:

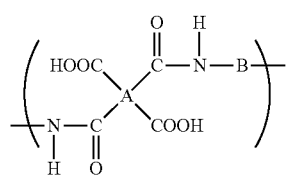

(I)

wherein in Formula (I), A represents a tetravalent organic group and B represents a divalent organic group.

DETAILED DESCRIPTION

Hereinafter, exemplary embodiments of the present invention will be described in detail.
Polyimide Precursor Composition A polyimide precursor composition according to the exemplary embodiment is a composition in which a resin (hereinafter, referred to as a "specific polyimide precursor") having a repeating unit represented by Formula (I) and an imidization ratio of 0.2 or less, acyclic amine compound, and an acyclic aliphatic amine compound are dissolved in an aqueous solvent. That is, the specific polyimide precursor, the cyclic amine compound, and the acyclic aliphatic amine compound are included in the composition in a state of being dissolved in the aqueous solvent. The solvent indicates a state in which residual dissolved materials are not visually identified.

The cyclic amine compound and the acyclic aliphatic amine compound are dissolved in the polyimide precursor composition according to the exemplary embodiment. Accordingly, (carboxylic group of) the specific polyimide precursor is in a form of an amine salt by the amine compound, and solubility of the specific polyimide precursor with respect to a water solvent is increased. Therefore, the polyimide precursor composition according to the exemplary embodiment has a high film-forming property, and is suitable as a composition for forming a polyimide molded article.

In addition, the cyclic amine compound and the acyclic aliphatic amine compound exhibit excellent imidization promoting action, when molding a polyimide molded article by using the polyimide precursor composition.

Herein, the cyclic amine compound has a small effect on dissolution of the specific polyimide precursor to the aqueous solvent due to being a form of an amine salt, but storage stability of the polyimide precursor composition tends to decrease. That is, the polyimide precursor composition obtained by combining an amount of the cyclic amine compound which can dissolve the specific polyimide precursor in the aqueous solvent, has a tendency that a decrease in viscosity easily occurs, under a room temperature (for example, 25° C.) environment.

On the other hand, the acyclic aliphatic amine compound has a large effect on dissolution of the specific polyimide precursor in the aqueous solvent due to being a form of an amine salt, but the storage stability of the polyimide precursor composition tends to hardly decrease, compared to the cyclic amine compound. That is, the polyimide precursor composition obtained by combining an amount of the cyclic amine compound which can dissolve the specific polyimide precursor to the aqueous solvent, has a tendency that an increase in viscosity easily occurs, under a room temperature (for example, 25° C.) environment.

Accordingly, if the cyclic amine compound and the acyclic aliphatic amine compound are dissolved together, viscosity change of the polyimide precursor composition is slight even over a long period of time, and the storage stability increases.

Thus, the polyimide precursor composition according to the exemplary embodiment is a polyimide precursor composition having excellent storage stability (hereinafter, also referred to as a "pot life") and in which imidization is efficiently promoted when molding a polyimide molded article.

The polyimide molded article molded using the polyimide precursor composition according to the exemplary embodiment has increased mechanical strength. Properties such as heat resistance, an electrical property, solvent resistance, and the like are also increased. In addition, productivity is also improved due to the imidization promoting action. Further, since the polyimide precursor composition has excellent storage stability, coating performance of the polyimide precursor composition is high and is readily maintained, and variation in quality of the polyimide molded article is also suppressed.

Herein, if the cyclic amine compound is included in the polyimide molded article, the cyclic amine compound hardly volatilizes by heating at the time of the molding, and accordingly voids may be generated on a surface of the polyimide molded article and quality of product appearance of the molded article is decreased. In addition, an insulating property of the polyimide molded article is also easily decreased. In contrast, by using the cyclic amine compound, and the acyclic aliphatic amine compound which readily volatilizes by heating at the time of the molding, in combination, and decreasing a used amount of the cyclic amine compound, generation of voids on the surface of the polyimide molded article, and a decrease in the insulating property are suppressed.

In the polyimide precursor composition according to the exemplary embodiment, since the cyclic amine compound and the acyclic aliphatic amine compound are dissolved in the solvent in a state of being a form of an amine salt in (carboxylic group of) the specific polyimide precursor, a unique odor of the amine compound of the polyimide precursor composition is also suppressed.

In addition, the cyclic amine compound tends to have a unique odor, compared to the acyclic aliphatic amine compound, and when performing heating and molding of the polyimide molded article using the polyimide precursor composition, the odor of the cyclic amine compound may be released due to the heating thereof. However, by using the cyclic amine compound and the acyclic aliphatic amine compound in combination and decreasing a used amount of the cyclic amine compound, a burden of an operation is suppressed with low odor even when performing the heating and molding.

In the polyimide precursor composition according to the exemplary embodiment, since the specific polyimide precursor, the cyclic amine compound, and the acyclic aliphatic amine compound are dissolved in the aqueous medium, corrosion of a base material as a base is suppressed when molding the polyimide molded article. This may be because an acid property of a carboxylic group of the specific polyimide precursor is suppressed due to basicity of the cyclic amine compound and the acyclic aliphatic amine compound which coexist with each other.

In the polyimide precursor composition according to the exemplary embodiment, in a case of applying a specific polyimide precursor (aromatic polyimide precursor) in which A in Formula (I) represents a tetravalent aromatic organic group and B represents a divalent aromatic organic group, the polyimide precursor thereof normally tends to be hardly dissolved in a solvent, but the aqueous solvent is applied as a solvent, and the specific polyimide precursor is dissolved thereto in a state of being a form of an amine salt by the cyclic amine compound and the acyclic aliphatic amine compound. Accordingly, even in a case where the aromatic polyimide precursor is applied as the specific polyimide precursor, the film-forming property is high and environmental compatibility is excellent.

In the polyimide precursor composition according to the exemplary embodiment, the aqueous solvent indicates a solvent containing at least 70% by weight or more of water. Accordingly, the polyimide precursor composition according to the exemplary embodiment has excellent environmental compatibility. In addition, when molding the polyimide molded article using the polyimide precursor composition according to the exemplary embodiment, a decrease in a heating temperature for a solvent distilling method, and shortening of the heating time are realized.

In the polyimide precursor composition according to the exemplary embodiment, the aqueous solvent is applied as a solvent, but it is preferable that an aprotic polar solvent be not included in the aqueous solvent.

In addition, the aprotic polar solvent is a solvent having a boiling point of 150° C. to 300° C. and a dipole moment of 3.0 D to 5.0 D. Specifically, as the aprotic polar solvent, N-methyl-2-pyrolidone (NMP), N,N-dimethylformamide (DMF), N,N-dimethylacetamide (DMAc), dimethylsulfoxide (DMSO), hexamethylene phosphoramide (HMPA), N-methyl caprolactam, N-acetyl-2-pyrolidone, or the like is used, for example.

The aprotic polar solvent which is represented by N-methyl-2-pyrolidone (NMP) has a high boiling point of 150° C. or higher, and the solvent thereof in the composition remains in the molded article, even after a drying step in the production of the polyimide molded article, in many cases. If the aprotic polar solvent remains in the polyimide molded article, reorientation of a polymer chain of the polyimide precursor occurs and a packing property of the polymer chain is damaged, and therefore, the mechanical strength of the obtained polyimide molded article may be decreased.

In contrast, by not including the aprotic polar solvent in the aqueous solvent, the aprotic polar solvent is also not included in the obtained polyimide molded article. As a result, a decrease in mechanical strength of the polyimide molded article due to the polyimide precursor composition according to the exemplary embodiment is suppressed.

The specific polyimide precursor as the polyimide precursor is not a low-molecular compound or does not have a structure in which a force of interaction between polymer chains is decreased by introducing a bent chain or cyclic aliphatic structure in a primary structure and solubility to the solvent is increased, but by applying the aqueous solvent as a solvent, (carboxylic group of) the specific polyimide precursor is dissolved by being in a form of an amine salt by the cyclic amine compound and the acyclic aliphatic amine compound. Accordingly, water solubilizing of the polyimide precursor is realized, without an occurrence of a decrease in the mechanical strength of the polyimide molded article due to low molecules of the polyimide precursor and a change in a molecular structure of the polyimide precursor, which occurs in a method for improving solubility of the polyimide precursor resin of the related art.

In addition, by not including the aprotic polar solvent in the aqueous solvent, it is easy to obtain a polyimide resin molded article which has excellent properties such as heat resistance, an electrical property, solvent resistance, and the like, in addition to the mechanical strength.

Hereinafter, each component of the polyimide precursor composition according to the exemplary embodiment will be described.

Specific Polyimide Precursor

The specific polyimide precursor is a resin (polyamic acid) having a repeating unit represented by Formula (I) and having an imidization ratio of 0.2 or less.

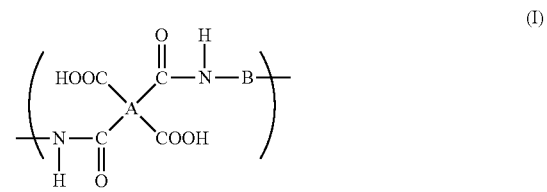

In Formula (I), A represents a tetravalent organic group and B represents a divalent organic group.

Herein, the tetravalent organic group represented by A in Formula (I) is a residue obtained by removing four carboxylic groups from tetracarboxylic dianhydride which is a raw material.

Meanwhile, the divalent organic group represented by B is a residue obtained by removing two amino groups from a diamine compound which is a raw material.

That is, the specific polyimide precursor having a repeating unit represented by Formula (I) is a polymer of tetracarboxylic dianhydride and the diamine compound.

Examples of tetracarboxylic dianhydride include any aromatic and aliphatic compounds, but an aromatic compound is preferable. That is, the tetravalent organic group represented by A in Formula (I) is preferably an aromatic organic group.

Examples of aromatic tetracarboxylic dianhydride include pyromellitic dianhydride, 3,3'4,4'-benzophenone tetracarboxylic dianhydride, 3,3',4,4'-biphenyl sulfone tetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyl diphenylsilane tetracarboxylic dianhydride, 3,3',4,4'-tetraphenyl silane tetracarboxylic dianhydride, 1,2,3,4-furan tetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidene diphthalic dianhydride, 3,3',4,4'-biphenyl tetracarboxylic dianhydride, 2,3,3',4'-biphenyl tetracarboxylic dianhydride, bis(phthalic acid)phenylphosphine oxide dianhydride, p-phenylene-bis(triphenyl phthalate)dianhydride, m-phenylene-bis(triphenyl phthalate)dianhydride, bis (triphenyl phthalate)-4,4'-diphenyl ether dianhydride, bis (triphenyl phthalate)-4,4'-diphenylmethane dianhydride, and the like.

Examples of aliphatic tetracarboxylic dianhydride include aliphatic or alicyclic tetracarboxylic dianhydride such as butanetetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentanetetracarboxylic dianhydride, 2,3,5-tricarboxycyclopentylacetic dianhydride, 3,5,6-tricarboxy norbornene-2-acetic acid dianhydride, 2,3,4,5-tetrahydrofuran tetracarboxylic dianhydride, 5-(2,5-dioxotetrahydrofuryl)-3-methyl-3-cyclohexene-1,2-di carboxylic anhydride, and bicyclo[2,2,2]-oct-7-en-2,3,5,6-tetracarboxylic dianhydride; aliphatic tetracarboxylic dianhydride having an aromatic ring such as 1,3,3a,4,5,9b-hexahydro-2,5-dioxo-3-furanyl)-naphtho[1,2-c]-furan-1,3-diode, 1,3,3a,4,5,9b-hexahydro-5-methyl-5-(tetrahydro-2,5-dioxo-3-furanyl)-naphtho[1,2-c]furan-1,3-dione, or 1,3,3a,4,5,9b-hexahydro-8-methyl-5-(tetrahydro-2,5-dioxo-3-furanyl)-naphtho[1,2-c]furan-1,3-dione; and the like.

Among them, as tetracarboxylic dianhydride, aromatic tetracarboxylic dianhydride is preferable, in detail, for example, pyromellitic dianhydride, 3,3'4,4'-biphenyl tetracarboxylic dianhydride, 2,3,3',4'-biphenyl tetracarboxylic dianhydride, 3,3',4,4'-biphenyl ether tetracarboxylic dianhydride, and 3,3',4,4'-benzophenone tetracarboxylic dianhydride are preferable, pyromellitic dianhydride, 3,3',4,4'-biphenyl tetracarboxylic dianhydride, 3,3',4,4'-benzophenone tetracarboxylic dianhydride, are further preferable, and 3,3',4,4'-biphenyl tetracarboxylic dianhydride is particularly preferable.

In addition, tetracarboxylic dianhydride may be used alone as one kind or may be used in combination of two or more kinds.

Further, in a case of using tetracarboxylic dianhydride in combination of two or more kinds, aromatic tetracarboxylic acids or aliphatic tetracarboxylic acids may be used in combination, respectively, or aromatic tetracarboxylic acid and aliphatic tetracarboxylic acid may be used in combination.

Meanwhile, the diamine compound is a diamine compound having two amino groups in a molecular structure. Examples of the diamine compound include any aromatic and aliphatic compounds, but an aromatic compound is preferable. That is, the divalent organic group represented by B in Formula (I) is preferably an aromatic organic group.

Examples of the diamine compound include aromatic diamines such as p-phenylenediamine, m-phenylenediamine, 4,4'-diaminodiphenyl methane, 4,4'-diaminodiphenyl ethane, 4,4'-diaminodiphenyl ether, 4,4'-diaminodiphenyl sulfide, 4,4'-diamino-diphenyl sulfone, 1,5-diamino naphthalene, 3,3-dimethyl-4,4'-diaminobiphenyl, 5-amino-1-(4'-aminophenyl)-1,3,3-trimethyl indane, 6-amino-1-(4'-aminophenyl)-1,3,3-trimethyl indane, 4,4'-diaminobenzanilide, 3,5-diamino-3'-trifluoromethyl benzanilide, 3,5-diamino-4'-trifluoromethyl benzanilide, 3,4'-diaminodiphenyl ether, 2,7-diaminofluorene, 2,2-bis(4-aminophenyl) hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxy biphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl] propane, 2,2-bis[4-(4-aminophenoxy)phenyl] hexafluoropropane, 1,4-bis(4-aminophenoxy)benzene, 4,4'-bis(4-aminophenoxy)-biphenyl, 1,3'-bis(4-aminophenoxy) benzene, 9,9-bis(4-aminophenyl) fluorene, 4,4'-(p-phenylene isopropylidene)bisaniline, 4,4'-(m-phenylene isopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamine having two amino groups and a hetero atom other than a nitrogen atom of the amino groups which are bonded to an aromatic ring such as diaminotetraphenylthiophene; aliphatic diamines or alicyclic diamines such as 1,1-metaxylylenediamine, 1,3-propane diamine, tetramethylene diamine, pentamethylene diamine, octamethylene diamine, nonamethylene diamine, 4,4-diamino heptamethylene diamine, 1,4-diaminocyclohexane, isophorone diamine, tetrahydrodicyclopentadienylene diamine, hexahydro-4,7-methno indanylene dimethylene diamine, tricyclo [6,2,1,0$^{2.7}$]-undecylenic dimethyldiamine, and 4,4'-methylenebis(cyclohexylamine); and the like.

Among them, as the diamine compound, an aromatic diamine compound is preferable, and in detail, for example, p-phenylenediamine, m-phenylenediamine, 4,4'-diaminodiphenyl methane, 4,4'-diaminodiphenyl ether, 3,4'-diaminodiphenyl ether, 4,4'-diaminodiphenyl sulfide, and 4,4'-diaminodiphenyl sulfone, are preferable, and 4,4'-diaminodiphenyl ether and p-phenylenediamine are particularly preferable.

In addition, the diamine compound may be used alone as one kind or may be used in combination of two or more kinds. Further, in a case of using the diamine compound in combination of two or more kinds, aromatic diamine compounds or aliphatic diamine compounds may be used in combination, respectively, or aromatic diamine compounds and aliphatic diamine compounds may be used in combination.

The specific polyimide precursor is a resin having an imidization ratio of 0.2 or less. That is, the specific polyimide precursor may be a resin which is partially imidized.

Specifically, as the specific polyimide precursor, a resin having a repeating unit represented by Formula (I-1), Formula (I-2), and Formula (I-3) is used, for example.

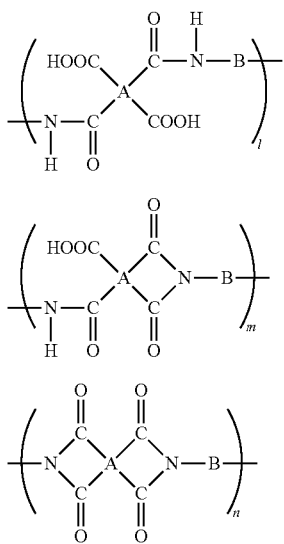

In Formula (I-1), Formula (I-2), and Formula (I-3), A represents a tetravalent organic group and B represents a divalent organic group. In addition, A and B are the same as A and B in Formula (I).

l represents an integer equal to or larger than 1, m and n each independently represent an integer of 0 or equal to or larger than 1, and a relationship of $(2n+m)/(2l+2m+2n) \leq 0.2$ is satisfied.

In Formulae (I-1) to (I-3), l represents an integer equal to or larger than 1, but preferably represents an integer of 1 to 200, more preferably represents an integer of 1 to 100. m and n each independently represent an integer of 0 or equal to or larger than 1, preferably represent an integer of 0 or 1 to 200, and more preferably represent an integer of 0 or 1 to 100.

l, m, and n satisfies a relationship of $(2n+m)/(2l+2m+2n) \leq 0.2$, preferably satisfies $(2n+m)/(2l+2m+2n) \leq 0.15$, and more preferably satisfies $(2n+m)/(2l+2m+2n) \leq 0.10$.

Herein, "$(2n+m)/(2l+2m+2n)$" represents a ratio of the number of imide ring-closing bonded portions (2n+m) to the number of all bonded portions (2l+2m+2n), in bonded portions of the specific polyimide precursor (reaction portion between tetracarboxylic dianhydride and the diamine compound). That is, "$(2n+m)/(2l+2m+2n)$" represents an imidization ratio of the specific polyimide precursor.

By setting the imidization ratio of the specific polyimide precursor (value of "$(2n+m)/(2l+2m+2n)$") to be equal to or less than 0.2 (preferably equal to or less than 0.15 and more preferably equal to or less than 0.10), occurrence of gelation or precipitation and separation of the specific polyimide precursor is suppressed.

The imidization ratio of the specific polyimide precursor (value of "$(2n+m)/(2l+2m+2n)$") is measured by the following method.

Measurement of Imidization Ratio of Polyimide Precursor
Production of Polyimide Precursor Sample (i) The polyimide precursor composition which is a measurement target is applied on a silicon wafer in a range of a film thickness of 1 μm to 10 μm, to produce a coated film sample.

(ii) The coated film sample is immersed in tetrahydrofuran (THF) for 20 minutes, to substitute a solvent in the coated film sample with tetrahydrofuran (THF). The solvent used for immersion is not limited to THF, and can be selected from solvents which do not dissolve the polyimide precursor and can be mixed with solvent components included in the polyimide precursor composition. In detail, an alcohol solvent such as methanol or ethanol, or an ether compound such as dioxane can be used.

(iii) The coated film sample is taken out from THF, and N2 gas is sprayed to THF attached to a surface of the coated film sample to remove TE-IF. The coated film sample is dried by processing under reduced pressure equal to or less than 10 mmHg and at a temperature in a range of 5° C. to 25° C. for 12 hours or more, and a polyimide precursor sample is produced.

Producing of 100% Imidized Standard Sample (iv) In the same manner as in (i), the polyimide precursor composition which is a measurement target is applied on a silicon wafer to produce a coated film sample.

(v) The coated film sample is heated at 380° C. for 60 minutes to attain an imidization reaction, and a 100% imidized standard sample is produced.

Measurement and Analysis (vi) Infrared absorption spectra of the 100% imidized standard sample and the polyimide precursor sample are measured by using a Fourier transform infrared spectrophotometer (FT-730 manufactured by HORIBA, LTD.). A ratio I'(100) of an absorption peak (Ab'(1780 cm$^{-1}$)) derived from imide bonds of the 100% imidized standard sample in the vicinity of 1780 cm$^{-1}$, to an absorption peak (Ab'(1500 cm$^{-1}$)) derived from an aromatic ring thereof in the vicinity of 1500 cm$^{-1}$ is acquired.

(vii) In the same manner as described above, measurement of the polyimide precursor sample is performed to acquire a ratio I(x) of an absorption peak (Ab (1780 cm$^{-1}$)) derived from imide bonds in the vicinity of 1780 cm$^{-1}$, to an absorption peak (Ab (1500 cm$^{-1}$)) derived from an aromatic ring in the vicinity of 1500 cm$^{-1}$.

Then, an imidization ratio of the polyimide precursor is calculated based on the following equations, using the measured absorption peaks I'(100) and I(x).

imidization ratio of polyimide precursor= I(x)/I'(100)   Equation:

I'(100)=(Ab'(1780 cm$^{-1}$))/(Ab'(1500 cm$^{-1}$))   Equation:

I(x)=(Ab(1780 cm$^{-1}$))/(Ab(1500 cm$^{-1}$))   Equation:

The measurement of the imidization ratio of the polyimide precursor is applied to measurement of an imidization ratio of the aromatic polyimide precursor. In a case of measuring an imidization ratio of an aliphatic polyimide precursor, a peak derived from a structure which does not change before and after the imidization reaction is used as an internal standard peak, instead of the absorption peak of the aromatic ring.

Terminal Amino Group of Polyimide Precursor

The specific polyimide precursor preferably includes a polyimide precursor (resin) having an amino group on a terminal, and more preferably includes a polyimide precursor having an amino group on the entire terminal.

The amino group is included on a molecular terminal of the polyimide precursor, for example, by adding a molar equivalent of the diamine compound used for polymerization reaction, more than a molar equivalent of tetracarboxylic dianhydride. A ratio of the molar equivalents of the diamine compound and tetracarboxylic dianhydride is preferably in a range of 1.0001 to 1.2, and more preferably in a range of 1.001 to 1.2, with respect to 1 of the molar equivalent of tetracarboxylic acid.

If the ratio of the molar equivalents of the diamine compound and tetracarboxylic dianhydride is equal to or more than 1.0001, a large effect of the amino group on the molecular terminal, and excellent dispersibility are obtained. In addition, if the ratio of the molar equivalents is equal to or less than 1.2, a large amount of molecular weight of the polyimide precursor is obtained, and for example, when using a film-shaped polyimide molded article, sufficient film strength (tear strength and tensile strength) is easily obtained.

The terminal amino group of the specific polyimide precursor is detected by acting trifluoroacetic anhydride (which quantitatively reacts with respect to the amino group) to the polyimide precursor composition. That is, the terminal amino group of the specific polyimide precursor is amidated by trifluoroacetic acid. After the process, the specific polyimide precursor is purified by reprecipitation or the like, to remove excessive trifluoroacetic anhydride and trifluoroacetic acid residue. By performing quantization for the specific polyimide precursor after the process by a nuclear magnetic resonance (NMR) method, an amount of the terminal amino group of the specific polyimide precursor is measured.

A number average molecular weight of the specific polyimide precursor is preferably from 1,000 to 100,000, more preferably from 5,000 to 50,000, and even more preferably from 10,000 to 30,000.

If the number average molecular weight of the specific polyimide precursor is set in the range described above, a decrease in solubility of the specific polyimide precursor with respect to the solvent is suppressed, and the film-forming property is readily secured. Particularly, in a case where the specific polyimide precursor including a resin having an amino group on a terminal is used, if the molecular weight is decreased, an abundance ratio of the terminal amino group is increased, and the solubility is easily decreased due to an effect of the cyclic amine compound coexisting in the polyimide precursor composition, but by setting the range of the number average molecular weight of the specific polyimide precursor as the range described above, a decrease in solubility can be suppressed.

In addition, by adjusting a ratio of molecular equivalents of tetracarboxylic dianhydride and the diamine compound, the specific polyimide precursor having the desired number average molecular weight is obtained.

The number average molecular weight of the specific polyimide precursor is measured by gel permeation chromatography (GPC) with the following measurement conditions.

Column: Tosoh TSK gelα-M (7.8 mm I.D×30 cm)
Eluent: DMF (dimethylformamide)/30 mM LiBr/60 mM phosphoric acid
Flow rate: 0.6 mL/zein
Injection volume: 60 μL
Detector: RI (differential refractive index detector)

Content (concentration) of the specific polyimide precursor is preferably from 0.1% by weight to 40% by weight, more preferably from 0.5% by weight to 25% by weight, and even more preferably from 1% by weight to 20% by weight, with respect to the entire polyimide precursor composition.

Cyclic Amine Compound

The cyclic amine compound is a compound which increases solubility with respect to the aqueous solvent by making (carboxylic group of) the specific polyimide precursor in a form of an amine salt, and functions as an imidization promoter.

The cyclic amine compound is preferably a water-soluble compound. Herein, water-soluble means that 1% by weight or more of an object substance dissolves with respect to water at 25° C.

The cyclic amine compound is an amine compound having a cyclic structure including nitrogen atoms, and a secondary amine compound and a tertiary amine compound are used.

Among them, the tertiary amine compound is preferable as the cyclic amine compound. If the tertiary amine compound is used as the cyclic amine compound, solubility of the specific polyimide precursor with respect to the aqueous solvent is readily increased and a film-forming property is readily improved.

In addition, as the cyclic amine compound, a di- or higher polyvalent amine compound is also used, other than a monovalent amine compound. If di- or higher polyvalent amine compound is used, a pseudo-crosslinked structure is readily formed between molecules of the specific polyimide precursor, and although the specific polyimide precursor is a low molecular weight component, viscosity of the polyimide composition is increased and a film-forming property is readily improved.

Examples of the cyclic amine compound include a cyclic aromatic amine compound and a cyclic aliphatic amine compound.

Examples of the cyclic aromatic amine compound include pyridines (amine compound having a pyridine skeleton), pyrimidines (amine compound having a pyrimidine skeleton), pyrazines (amine compound having a pyrazine skeleton), quinolines (amine compound having a quinoline skeleton), imidazoles (amine compound having an imidazole skeleton), and the like.

Among them, pyridines and imidazoles are preferable and imidazoles are more preferable as the cyclic aromatic amine compound, from viewpoints of synthesis efficiency of the polyimide precursor, and imidization promotion.

Here, imidazoles represented by the following Formula (0) are preferable as the imidazoles. Herein, in the following Formula (0), $R^{11}$, $R^{12}$, $R^{13}$, and $R^{14}$ each independently represent a hydrogen atom or an alkyl group.

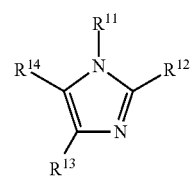

(0)

In the imidazoles represented by Formula (0), the alkyl group represented by $R^{11}$, $R^{12}$, $R^{13}$, and $R^{14}$ is preferably a linear or branched alkyl group having 1 to 5 carbon atoms (in detail, for example, a methyl group, an ethyl group, a propyl group, a butyl group, a pentyl group or the like).

Imidazole substituted with two or more alkyl groups is preferable as the imidazoles. That is, the imidazoles are preferably imidazoles in which two or more of $R^{11}$, $R^{12}$, $R^{13}$, and $R^{14}$ in Formula (0) are alkyl groups.

Specific examples of the imidazoles include 1,2-dimethylimidazole, 2-ethyl-4-methylimidazole, 4-ethyl-2-methylimidazole, 1-methyl-4-ethylimidazole, and the like.

The cyclic aromatic amine compound is preferably a compound having a boiling point equal to or higher than 100° C. (preferably from 100° C. to 300° C. and more preferably from 100° C. to 200° C.). If the boiling point of the cyclic aromatic amine compound is set to be equal to or higher than 100° C., volatilization of the cyclic amine compound from the polyimide precursor composition at the time of storage is suppressed, and a decrease in solubility of the specific polyimide precursor with respect to the aqueous solvent is easily suppressed.

Meanwhile, examples of the cyclic aliphatic amine compound include piperidines (amine compound having a piperidine skeleton), piperazines (amine compound having a piperazine skeleton), morpholines (amine compound having a morpholine skeleton), pyrrolidines (amine compound having a pyrrolidine skeleton), pyrazolidines (amine compound having a pyrazolidine skeleton), and the like.

Among them, piperidines represented by the following Formula (1), piperazines represented by the following Formula (2), morpholines represented by the following Formula (3), pyrrolidines represented by the following Formula (4), and pyrazolidines represented by the following Formula (5) are preferable as the cyclic aliphatic amine compound, from viewpoints of synthesis efficiency of the polyimide precursor, and imidization promotion.

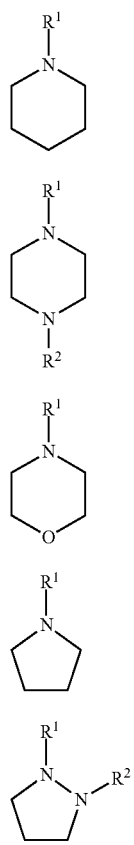

In Formulae (1) to (5), $R^1$ and $R^2$ each independently represent a hydrogen atom, an alkyl group having 1 to 6 carbon atoms, or a phenyl group.

As $R^1$ and $R^2$, a hydrogen atom, a methyl group, an ethyl group, a propyl group, a butyl group, a pentyl group, a hexyl group, or a phenyl group is more preferable.

Herein, at least one kind of compound selected from the group consisting of imidazoles, morpholines, piperidines, piperazines, pyrrolidines, and pyrazolidines is preferable, morpholines are more preferable, and morpholine, methylmorpholine, ethyl morpholine are even more preferable, as the cyclic amine compound, from viewpoints of synthesis efficiency of the polyimide precursor, and imidization promotion.

The cyclic aliphatic amine compound is preferably a compound having a boiling point of equal to or higher than 60° C. (preferably from 60° C. to 200° C. and more preferably from 70° C. to 150° C.). If the boiling point of the cyclic amine compound is set to be equal to or higher than 60° C., volatilization of the cyclic amine compound from the polyimide precursor composition at the time of storage is suppressed, and a decrease in solubility of the specific polyimide precursor with respect to the aqueous solvent is easily suppressed.

Content of the cyclic amine compound is, for example, preferably from 1 mol % to 200 mol %, more preferably from 1 mol % to 100 mol %, and even more preferably from 1 mol % to 10 mol %, with respect to a carboxylic group (—COOH) of the specific polyimide precursor resin in the polyimide precursor composition. If the content of the cyclic amine compound is less than 1 mol %, the specific polyimide precursor hardly dissolves, and if the content thereof exceeds 200 mol %, storage stability of the polyimide precursor composition may decrease and the odor may be too strong.

Acyclic Aliphatic Amine Compound

An acyclic aliphatic amine compound is a compound which increases solubility with respect to the aqueous solvent by making (carboxylic group of) the specific polyimide precursor in a form of an amine salt, and functions as an imidization promoter, although the effects thereof are degraded compared to the cyclic amine compound.

The acyclic aliphatic amine compound is preferably a water-soluble compound. Herein, water-soluble means that 1% by weight or more of an object substance dissolves with respect to water at 25° C.

The acyclic aliphatic amine compound is a linear or branched amine compound having an amino group and an aliphatic group, and a primary amine compound, a secondary amine compound, and a tertiary amine compound are used.

Among them, as the acyclic aliphatic amine compound, at least one kind (particularly, a tertiary amine compound) selected from a secondary amine compound and a tertiary amine compound is preferable. If a secondary amine compound or a tertiary amine compound is used as the acyclic aliphatic amine compound, solubility of the specific polyimide precursor with respect to the solvent readily increases, a film-forming property is readily improved, and storage stability of the polyimide precursor composition can also be improved.

As the acyclic aliphatic amine compound, a di- or higher polyvalent amine compound is also used, other than a monovalent amine compound. If a di- or higher polyvalent amine compound is used, a pseudo-crosslinked structure is readily formed between molecules of the specific polyimide precursor, and although the specific polyimide precursor is a low molecular weight component, viscosity of the polyimide composition is increased and a film-forming property is readily improved.

Examples of a primary amine compound include methylamine, ethylamine, n-propylamine, isopropylamine, 2-ethanolamine, 2-amino-2-methyl-1-propanol, and the like.

Examples of a secondary amine compound include dimethylamine, 2-(methylamino) ethanol, 2-(ethylamino) ethanol, and the like.

Examples of a tertiary amine compound include 2-dimethylaminoethanol, 2-diethylaminoethanol, 2-dimethylaminopropanol, triethylamine, and the like.

Examples of a polyvalent amine compound include polyamine and the like.

The acyclic aliphatic amine compound is preferably a compound having a boiling point of equal to or higher than 60° C. (preferably from 60° C. to 200° C. and more preferably from 70° C. to 150° C.). If the boiling point of the acyclic aliphatic amine compound is set to be equal to or higher than 60° C., volatilization of the acyclic aliphatic amine compound from the polyimide precursor composition at the time of storage is suppressed, and a decrease in solubility of the specific polyimide precursor with respect to the solvent is easily suppressed.

Content of the acyclic aliphatic amine compound is, for example, preferably from 30 mol % to 200 mol %, more preferably from 50 mol % to 150 mol %, and even more preferably from 100 mol % to 150 mol %, with respect to a carboxylic group (—COOH) of the specific polyimide precursor resin in the polyimide precursor composition. If the content of the acyclic aliphatic amine compound is set to be in the range described above, storage stability of the polyimide precursor composition is improved and a film-forming property is readily improved. In addition, odor is also suppressed at a low level, and a burden with respect to an operator is readily decreased.

Herein, a ratio of the cyclic amine compound to the acyclic aliphatic amine compound (molar ratio: cyclic amine compound/acyclic aliphatic amine compound) is preferably from 1/100 to 200/100, more preferably from 1/100 to 100/100, and even more preferably from 1/100 to 10/100, from viewpoints of storage stability of the polyimide precursor composition, synthesis efficiency of the polyimide precursor, and imidization promotion.

Aqueous Solvent

The aqueous solvent of the exemplary embodiment is a solvent containing at least 70% by weight of water. As the water, distilled water, ion exchange water, ultrafiltered water, pure water, or the like is used, for example.

Water is contained to be from 70% by weight to 100% by weight, preferably from 80% by weight to 100% by weight, and more preferably from 90% by weight to 100% by weight in the aqueous solvent, and it is specifically preferable not to contain a solvent other than water.

In a case where a solvent other than water is contained as the aqueous solvent, for example, a water-soluble organic solvent is suitably used.

Examples of the water-soluble organic solvent include a water-soluble ether solvent, a water-soluble ketone solvent, a water-soluble alcohol solvent, and the like. Herein, water-soluble means that 1% by weight or more of an object substance dissolves with respect to water at 25° C.

The water-soluble organic solvent may be used alone as one kind, but in a case of using two or more kinds in combination, for example, combination of a water-soluble ether solvent and a water-soluble alcohol solvent, combination of a water-soluble ketone solvent and a water-soluble alcohol solvent, combination of a water-soluble ether solvent, a water-soluble ketone solvent, and a water-soluble alcohol solvent, and the like are used.

The water-soluble ether solvent is a water-soluble solvent having an ether bond in one molecule. Examples of the water-soluble ether solvent include tetrahydrofuran (THF), dioxane, trioxane, 1,2-dimethoxyethane, diethylene glycol dimethyl ether, diethylene glycol diethyl ether, and the like. Among them, tetrahydrofuran and dioxane are preferable as the water-soluble ether solvent.

The water-soluble ketone solvent is a water-soluble solvent having a ketone group in one molecule. Examples of the water-soluble ketone solvent include acetone, methyl ethyl ketone, cyclohexanone, and the like. Among them, acetone is preferable as the water-soluble ketone solvent.

The water-soluble alcohol solvent is a water-soluble solvent having an alcoholic hydroxyl group in one molecule. Examples of the water-soluble alcohol solvent include methanol, ethanol, 1-propanol, 2-propanol, tert-butyl alcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, 1,2,6-hexanetriol, and the like. Among them, methanol, ethanol, 2-propanol, and ethylene glycol are preferable as the water-soluble alcohol solvent.

In a case of containing a solvent other than water as the aqueous solvent, a boiling point of a solvent to be used in combination is preferably equal to or lower than 160° C., more preferably from 40° C. to 150° C., and even more preferably from 50° C. to 120° C. If the boiling point of the solvent to be used in combination is set to be in the range described above, the solvent hardly remains in the polyimide molded article, and a polyimide molded article having high mechanical strength is easily obtained.

Other Additives

The polyimide precursor composition according to the exemplary embodiment may include various filler items in order to apply various functions such as conductivity or mechanical strength to the polyimide molded article to be produced using this composition, or may further include a catalyst for imidization reaction promotion or a leveling material for film-forming quality improvement.

As conductive materials added in order to apply conductivity, a conductive material (for example, having volume resistivity of less than $10^7$ Ω·cm, the same applies hereinafter) or a semiconductive material (for example, having volume resistivity of $10^7$ Ω·cm to $10^{13}$ Ω·cm, the same applies hereinafter) is used, and is selected depending on the purpose of use.

Examples of the conductive material include carbon black (for example, acidic carbon black having pH of equal to or less than 5.0), metal (for example, aluminum or nickel), metal oxide (for example, yttrium oxide or tin oxide), an ion conductive material (for example, potassium titanate or LiCl), a conductive polymer (for example, polyaniline, polypyrrole, polysulfone, or polyacetylene), and the like.

The conductive materials may be used alone as one kind, or may be used in combination with two or more kinds.

In addition, in a case where the conductive material has a particle shape, particles having a primary particle size of less than 10 μm and preferably equal to or less than 1 μm are preferably used.

As the filler added for mechanical strength improvement, a particle-shaped material such as silica powder, alumina powder, barium sulfate powder, titanium oxide powder, mica, talc, or the like is used. In addition, in order to improve water repellency and a release property of the surface of the polyimide molded article, fluorine resin powder such as polytetrafluoroethylene (PTFE) or tetrafluoroethylene perfluoroalkyl vinyl ether copolymer (PFA) may be used.

As a catalyst for imidization reaction promotion, a dehydrating agent such as acid anhydride, or an acidic catalyst such as a phenol derivative, a sulfonic acid derivative, or a benzoic acid derivative may be used.

A surfactant may be used for the improvement of the film-forming quality of the polyimide molded article. As the surfactant to be used, any of cationic, anionic, and nonionic surfactants may be used.

Contents of other additives may be selected depending on the purpose of use of the polyimide molded article to be produced.

Method of Producing Polyimide Precursor Composition

A method of producing the polyimide precursor composition according to the exemplary embodiment is not particularly limited, but a producing method described in (1) or (2) is used.

(1): A method of producing a polyimide precursor composition, the method including: polymerizing tetracarboxylic dianhydride and a diamine compound in an aqueous solvent in the presence of a cyclic amine compound and an acyclic aliphatic amine compound, to form a resin (that is, a "polyimide precursor").

The producing method described in (1) is a method of producing a polyimide precursor composition, the method including: dissolving the cyclic amine compound and the acyclic aliphatic amine compound in the aqueous solvent and adding the tetracarboxylic dianhydride and the diamine compound in the aqueous solvent to perform polymerization.

(2) A method of producing a polyimide precursor composition, the method including: polymerizing tetracarboxylic dianhydride and a diamine compound in an aqueous solvent in the presence of a cyclic amine compound to form a resin (that, is, a "polyimide precursor"), and then mixing the aqueous solvent including the formed resin and an acyclic aliphatic amine compound with each other, or mixing the formed resin, an aqueous solvent, and an acyclic aliphatic amine compound with each other.

The producing method described in (2) is, for example, a method of producing a polyimide precursor composition, the method including: dissolving the cyclic amine compound in the aqueous solvent, adding tetracarboxylic dianhydride and the diamine compound in the aqueous solvent to perform polymerization, and then adding the acyclic aliphatic amine compound.

In the producing method described in (2), a method of mixing the aqueous solvent including the formed resin and the acyclic aliphatic amine compound with each other is, for example, a method of forming a resin in an aqueous solvent, and then adding an acyclic aliphatic amine compound in the aqueous solvent.

Meanwhile, in the producing method described in (2), the method including: mixing the formed resin, the aqueous solvent, and the acyclic aliphatic amine compound with each other, is for example, a method of forming a resin in an aqueous solvent, then extracting the resin from the aqueous solvent, and mixing the extracted resin, an aqueous solvent, and an acyclic aliphatic amine compound with each other. In detail, after forming a resin in an aqueous solvent, an acidic aqueous solution is added to the aqueous solvent to precipitate the resin in the aqueous solvent. Next, the resin is filtered from the aqueous solvent. Then, the filtered resin, an acyclic aliphatic amine compound, and a new aqueous solvent are mixed with each other. In addition, a cyclic amine compound and a new aqueous solvent may be further mixed to the mixed composition, in order to adjust concentration of the cyclic amine compound. Hereinafter, this step is called an "amine substitution step".

In the amine substitution step, when filtering the formed resin from the aqueous solvent, a part of the cyclic amine compound is filtered with the aqueous solvent. That is, the amount of the cyclic amine compound included in the resin is decreased through the amine substitution step.

Accordingly, in the producing method described in (2), when polymerizing the resin, a necessary amount of the cyclic amine compound sufficient for dissolving each monomer and a polymerization reaction is combined thereto, and stable polymerization with high efficiency is realized. Meanwhile, through the amine substitution step after the polymerization, the amount of the cyclic amine compound which is a reason for degraded storage stability of the polyimide precursor composition or a reason for the odor, is decreased, and is substituted with the acyclic aliphatic amine compound. Accordingly, storage stability of the obtained polyimide precursor composition is maintained and odor is also suppressed.

Examples of the acidic aqueous solution used in the amine substitution step include aqueous solutions of inorganic acid (for example, hydrochloric acid, sulfuric acid, nitric acid, phosphoric acid, and the like), aqueous solutions of organic acid (for example, acetic acid, propionic acid, butanoic acid, phthalic acid, sulfonic acid, and the like). Among them, acetic acid and propionic acid which have a slight affect on property degradation even in a case of remaining in the produced polyimide precursor composition are preferable as the acidic aqueous solution.

In the method of producing the polyimide precursor composition according to the exemplary embodiment, production of the polyimide precursor is performed in an aqueous solvent in which no aprotic polar solvent is included or at least content of an aprotic polar solvent is decreased, in the presence of the cyclic amine compound.

In the method of producing the polyimide precursor composition according to the exemplary embodiment, the aprotic polar solvent which is a reason for a decrease in mechanical strength of the polyimide molded article is not used or is decreased, as the aqueous solvent, and since the cyclic amine compound is added thereto, inhibition (inhibition of a polymerization reaction) of production of the polyimide precursor is suppressed by the cyclic amine compound.

Accordingly, in the method of producing the polyimide precursor composition according to the exemplary embodiment, a polyimide precursor composition with which a polyimide molded article having high mechanical strength is obtained, is produced.

In addition, in the method of producing the polyimide precursor composition according to the exemplary embodiment, a polyimide precursor composition with which a polyimide molded article having excellent heat resistance, an electrical property, and solvent resistance, in addition to mechanical strength is readily obtained, is produced.

Further, in the method of producing the polyimide precursor composition according to the exemplary embodiment, since the aqueous solvent is used as the solvent, a polyimide precursor composition is produced with high productivity.

A reaction temperature at the time of a polymerization reaction of the polyimide precursor is, for example, preferably from 0° C. to 70° C., more preferably from 10° C. to 60° C., and even more preferably from 20° C. to 55° C. By setting the reaction temperature to be equal to or higher than 0° C., the process of the polymerization reaction is promoted, time necessary for the reaction is shortened, and productivity is readily improved. Meanwhile, if the reaction temperature is equal to or lower than 70° C., a process of an imidization reaction occurring in molecules of the formed polyimide precursor is suppressed, and precipitation or gelation accompanied with a decrease in solubility of the polyimide precursor is easily suppressed.

In addition, the time of the polymerization reaction of the polyimide precursor may be in a range of 1 hour to 24 hours depending on the reaction temperature.

Method of Producing Polyimide Molded Article

A method of producing a polyimide molded article according to the exemplary embodiment is a method of producing a polyimide molded article including molding the polyimide precursor composition according to the exemplary embodiment (hereinafter, also referred to as a "specific polyimide precursor composition") by heat treatment.

In detail, the method of producing a polyimide molded article according to the exemplary embodiment, for example, includes a step (hereinafter, referred to as a "coated film forming step") of applying the specific polyimide precursor composition onto a material to be coated to form a coated film, and a step (hereinafter, referred to as a "heating step") of performing heat treatment of the coated film to form a polyimide resin layer.

Coated Film Forming Step

First, a material to be coated is prepared. This material to be coated is selected depending on the purpose of the polyimide molded article to be produced.

In detail, in a case of producing a liquid crystal alignment film as a polyimide molded article, various substrates used for a liquid crystal element is used as the material to be coated, and a silicon substrate, a glass substrate, or a substrate thereof having a metal or alloy film formed on a surface thereof is used, for example.

In addition, in a case of producing a passivation film as a polyimide molded article, the material to be coated is selected from, for example, a semiconductor substrate on which an integrated circuit is formed, a wiring board on which wires are formed, a printed circuit board on which electronic components and wires are provided, and the like.

Further, in a case of producing a wire coating material as a polyimide molded article, for example, various electric wires (wire materials, rod materials or plate materials made of annealed copper, hard copper, oxygen-free copper, chromium ore, or aluminum) are used as the material to be coated. In a case of forming and processing a polyimide molded article into a tape shape and using this as a tape-shaped wire coating material for winding on an electric wire, various flat substrates or cylindrical substrates are used as the material to be coated.

Furthermore, in a case of producing an adhesive film as a polyimide molded article, various molded article (for example, various electronic components such as a semiconductor chip, a printed circuit board, and the like) which are adhesion targets are used, for example.

Next, the specific polyimide precursor composition is applied to a material to be coated with the desired target, and a coated film of the specific polyimide precursor composition is formed.

The method of applying the specific polyimide precursor composition is not particularly limited, and various coating method such as a spray coating method, a spin-coating method, a roll coating method, a bar coating method, a split die coating method, an ink jet coating method, and the like are used, for example.

Heating Step

Next, drying treatment is performed with respect to the coated film of the specific polyimide precursor composition. A dried film (dried un-imidized film) is formed by this drying treatment.

In heating conditions of the drying treatment, the heating time is preferably from 10 minutes to 60 minutes at a temperature of 80° C. to 200° C., for example, and the heating time may be shortened as the temperature is high. At the time of heating, it is effective to apply a hot blast. At the time of heating, the temperature may be increased in a stepwise manner or may be increased without changing a rate.

Next, imidization treatment is performed with respect to the dried film. Accordingly, a polyimide resin layer is formed.

In heating conditions of the imidization treatment, heating is performed at, for example, 150° C. to 400° C. (preferably from 200° C. to 300° C.) for 20 minutes to 60 minutes so that an imidization reaction occurs and the polyimide resin layer is formed. At the time of the heating reaction, the heating may be performed by gradually increasing the temperature in a stepwise manner or at a constant rate, before reaching the final temperature of the heating.

A polyimide molded article is formed through the steps described above. Then, if necessary, the polyimide molded article is extracted from the material to be coated, and post-processing is performed.

Polyimide Molded Article

The polyimide molded article according to the exemplary embodiment is a polyimide molded article obtained by the method of producing a polyimide molded article according to the exemplary embodiment. As the polyimide molded article, various polyimide molded articles such as a liquid crystal alignment film, a passivation film, a wire coating material, and an adhesive film are used, as examples. In addition, as the polyimide molded article, a flexible electronic substrate film, a copper-clad laminated layer film, a laminated film, an electric insulating film, a porous film for fuel cell, a separation film, a heat resistant film, an IC package, a resist film, a planarization film, a microlens array film, an optical fiber coating film, and the like are used, for examples.

As the polyimide molded article, a belt member is also used. As the belt member, a driving belt, belts for an electrophotographic image forming apparatus (for example, an intermediate transfer belt, a transfer belt, a fixing belt, and a conveying belt), and the like are used.

That is, the method of producing a polyimide molded article according to the exemplary embodiment can be applied to the method of producing various polyimide molded articles described above.

The aqueous solvent, the cyclic amine compound, and the acyclic aliphatic amine compound included in the specific polyimide precursor composition, are contained in the polyimide molded article according to the exemplary embodiment.

An amount of the aqueous solvent contained in the polyimide molded article according to the exemplary embodiment is equal to or more than 1 ppb and less than 1% in the polyimide molded article. The amount of the aqueous solvent contained in the polyimide molded article is obtained by quantizing an amount of gas generated by heating the polyimide molded article, by a gas chromatography method. In addition, amounts of the cyclic amine compound and the acyclic aliphatic amine compound contained in the polyimide molded article are obtained by quantizing an amount of gas generated by heating the polyimide molded article, by a gas chromatography method.

EXAMPLES

Hereinafter, examples will be described, but the exemplary embodiments of the present invention are not limited to the examples. In addition, in the description below, both "part" and "%" are a weight basis, unless otherwise noted.

Example 1

Producing Polyimide Precursor Composition (A-1)

A flask with a stirring rod, a thermometer, and a dropping funnel attached thereto is filled with 900 g of water. 27.28 g (252.27 millimoles: diamine compound) of p-phenylenediamine (hereinafter, noted as FDA: molecular weight of 108.14) and 76.55 g (756.81 millimoles) of methylmorpholine (hereinafter, noted as MMO: cyclic amine compound) are added thereto, stirred at 20° C. for 10 minutes, and dispersed. 72.72 g (247.16 millimoles) of 3,3',4,4'-biphenyl tetracarboxylic dianhydride (hereinafter, noted as BPDA: molecular weight of 294.22: tetracarboxylic dianhydride) is added to this solvent, stirred for 24 hours while maintaining a reaction temperature at 20° C. to perform dissolving and to attain a reaction. In Tables 1 to 4, a series of the steps described above is noted as a "polymerization step".

After the reaction, 45.45 g (756.81 millimoles) of acetic acid is added thereto to precipitate a polyimide precursor (resin). After filtering with a 100-meshed filter, the polyimide precursor is returned to the flask, 550 g of water (additional solvent) and 44.97 g (504.54 millimoles) of dimethylaminoethanol (hereinafter, noted as DMAEt: molecular weight of 89.14: acyclic aliphatic amine compound) are added thereto, stirred at 20° C. for 12 hours to be dissolved, and the polyimide precursor is dissolved.

Solid content is measured to be 13.5% by a dry weight method. In addition, MMO is quantized to be 0.05%.

0.13 g (1.29 millimoles) of MMO and 45.27 g of water (additional solvent) are added thereto and adjustment is performed so as to have a solid content of 10% and MMO concentration of 5 moil with respect to the polyimide precursor, to obtain a polyimide precursor composition (A-1). In Tables 1 to 5, a series of steps from the addition of the acetic acid to the addition of MMO as the cyclic amine compound and water as the additional solvent is noted as the "amine substitution step".

Herein, an imidization ratio of the formed polyimide precursor is 0.02%, and as a result of measurement of an amount of a terminal amino group, at least an amino group is included on a terminal.

Each measurement is performed as follows.
Viscosity Measurement Method

Viscosity is measured under the following conditions using an E type viscometer.

Measurement apparatus: E type rotating viscometer TV-20H (manufactured by Toki Sangyo Co., ltd.)
Measurement probe: No. 3 rotor 3°×R14
Measurement temperature: 22° C.
Solid Content Measurement Method The solid content is measured under the following conditions using a differential thermal and thermogravimetric measurement apparatus. The solid content is measured as a solid fraction as polyimide, using a measurement value at 380° C.

Measurement apparatus: differential thermal and thermogravimetric measurement apparatus TG/DTA6200 (Seiko Instruments Inc.)
Measurement range; from 20° C. to 400° C.
Temperature rising rate: 20° C./min Measurement of Content of Amine Compound Content of the amine compound such as the cyclic amine compound or the acyclic aliphatic amine compound are quantized and measured with the following apparatus by generated gas mass analysis method.

Measurement apparatus: GCMS-QP2010SE (Shimadzu Corporation)
Column: Agilent J&W DB (25 mmϕ: 30 m)
Evaluation A film is produced by performing film forming using the obtained polyimide precursor composition (A-1) and a film-forming property thereof is evaluated. In addition, mechanical characteristics (tensile strength and tensile elongation) of the obtained film are measured.
Film-Forming Property A film is formed by the following operation using the polyimide precursor composition (A-1). (1) Void marks and (2) surface unevenness and patterns of the film are evaluated.

Coating method: a bar coating method of using a coating blade with a spacer installed thereto, so as to have a coating thickness of 100 μm
Coating base material: 1.1 mmt glass substrate
Drying temperature: 60° C.×10 minutes
Burning temperature: 250° C.×30 minutes
(1) Void Marks Presence or absence of the void marks on the surface of the film is evaluated. Evaluation criteria are as follows.

A: Generation of void marks is not recognized.
B: Equal to or more than 1 and less than 10 of void marks can be confirmed on the surface of the film.
C: Equal to or more than 10 and less than 50 of void marks are scattered on the surface of the film.
D: Countless void marks are uniformly generated on the surface of the film.
(2) Surface Unevenness and Patterns Absence or presence of surface unevenness and the patterns generated on the surface of the film is evaluated. Evaluation criteria are as follows.

A: Generation of surface unevenness and the patterns are not recognized.
B: Surface unevenness and the patterns can be slightly confirmed on a part of the surface of the film (less than 10% of the film surface area).
C: Surface unevenness and the patterns can be confirmed on a part of the surface of the film.
D: Surface unevenness and the patterns are uniformly generated on the surface of the film (10% or more of the film surface area).
Tensile Strength and Elongation A sample piece from the produced film is punched and molded using dumbbell No. 3. The sample piece is installed in a tensile tester, and load application (tensile strength) and breaking elongation (tensile elongation) with which the sample piece is tensile-broken are measured under the following conditions.

Test device: tensile tester 1605 type manufactured by Aikoh Engineering Co., Ltd.
Sample length: 30 mm
Sample width: 5 mm
Tensile rate: 10 mm/min
Insulating Property An insulating property of the film is evaluated as follows. Evaluation determination is performed with a volume resistivity of the film sample. A measurement method is based on JIS K6911 and JIS K6271 using the following devices.
Device main body: superinsulating instrument R-503 manufactured by Kawaguchi Electric Works.
Electrode device: measuring electrode P-616 manufactured by Kawaguchi Electric Works.
Evaluation criteria are as follows.
- A: Equal to or more than $10^{13}$ Ω·m
- B: Equal to or more than $10^{12}$ Ω·m and less than $10^{13}$ Ω·m
- C: Equal to or more than $10^{11}$ Ω·m and less than $10^{12}$ Ω·m
- D: Less than $10^{11}$ Ω·m Pot Life The polyimide precursor composition is stored in an environment of a normal temperature and normal humidity (22° C., 55% RH) for 240 hours, and viscosity of a polyamic acid composition before and after storage is measured by the E-type viscometer. Details of the E-type viscometer are as follows.

Details of E-Type viscometer

E-type viscometer: (TV-22 type or TV-25 type manufactured by Toki Sangyo Co., Ltd.), circulation thermostatic bath
- Rotor: 3°×R14
- Rotation rate of rotor: 50 rpm
- Measurement temperature: 22±0.5° C.

Evaluation Criteria of Pot Life
- A: A difference in viscosity of the polyamic acid composition before and after storage is within 3%.
- B: A difference in viscosity of the polyamic acid composition before and after storage is larger than 3% and equal to and less than 10%.
- C: A difference in viscosity of the polyamic acid composition before and after storage is larger than 10% and equal to and less than 15%.
- C: A difference in viscosity of the polyamic acid composition before and after storage exceeds 15%.

Examples 2 to 9

Producing Polyimide Precursor Compositions (A-2) to (A-9)

Polyimide precursor compositions (A-2) to (A-9) are produced in the same manner as in Example 1, except for changing the producing conditions of the polyimide precursor composition to conditions disclosed in Table 1 and Table 2.

Films are produced and evaluation is performed in the same manner as in Example 1. Evaluation results are shown in Table 1 and Table 2.

Example 10

Producing Polyimide Precursor Composition (B-1)

A flask with a stirring rod, a thermometer, and a dropping funnel attached thereto is filled with 900 g of water. 27.28 g (252.27 millimoles) of PDA, 2.55 g (25.23 millimoles) of MMO, 44.97 g (504.54 millimoles) of DMAEt are added thereto, stirred at 20° C. for 10 minutes, and dispersed. 72.72 g (247.16 millimoles) of BPDA is added to this solvent, stirred for 48 hours while maintaining a reaction temperature at 20° C. to perform dissolving and to attain a reaction, and accordingly a polyimide precursor composition (B-1) is obtained. In Table 2, this step is noted as a "polymerization step".

An imidization ratio of the formed polyimide precursor is 0.04, and as a result of measurement of an amount of a terminal amino group described above, at least an amino group is included on a terminal.

A film is produced and evaluation is performed in the same manner as in Example 1. Evaluation results are shown in Table 2.

Examples 11 to 13

Producing Polyimide Precursor Compositions (A-10) to (A-14)

Polyimide precursor compositions (A-10) to (A-14) are produced in the same manner as in Example 1, except for changing the producing conditions of the polyimide precursor composition to conditions disclosed in Table 3 and Table 4.

Films are produced and evaluation is performed in the same manner as in Example 1. Evaluation results are shown in Table 3 and Table 4.

Comparative Example 1

Producing Polyimide Precursor Composition (X-1)

A flask with a stirring rod, a thermometer, and a dropping funnel attached thereto is filled with 853.73 g of water. 27.28 g (252.27 millimoles) of PDA and 52.51 g (519.04 millimoles) of MC are added thereto, stirred at 20° C. for 10 minutes, and dispersed. 72.72 g (247.16 millimoles) of BPDA is added to this solvent, stirred for 24 hours while maintaining a reaction temperature at 20° C. to perform dissolving and to attain a reaction, and accordingly a polyimide precursor composition (X-1) is obtained.

An imidization ratio of the formed polyimide precursor is 0.04, and as a result of measurement of an amount of a terminal amino group described above, at least an amino group is included on a terminal.

A film is produced and evaluation is performed in the same manner as in Example 1. Evaluation results are shown in Table 5.

Comparative Example 2

Producing Polyimide Precursor Composition (X-2)

A flask with a stirring rod, a thermometer, and a dropping funnel attached thereto is filled with 847.49 g of water. 27.28 g (252.27 millimoles) of FDA and 46.27 g (519.04 millimoles) of DMAEt are added thereto, stirred at 20° C. for 10 minutes, and dispersed. 72.72 g (247.16 millimoles) of BPDA is added to this solvent, and stirred for 48 hours while maintaining a reaction temperature at 20° C., but the monomers are not dissolved.

Comparative Example 3

Producing Polyimide Precursor Composition (X-3)

A flask with a stirring rod, a thermometer, and a dropping funnel attached thereto is filled with 900.00 g of N-methyl-2-pyrrolidone (hereinafter, abbreviated as NMP). 27.28 g (252.27 millimoles) of PDA is added thereto, stirred at 20°

C. for 10 minutes, and dispersed. 72.72 g (247.16 millimoles) of BPDA is added to this solvent, stirred for 24 hours while maintaining a reaction temperature at 20° C. to perform dissolving and to attain a reaction.

After the reaction, 10 liters of methanol is added thereto to precipitate a polyimide precursor (resin). After filtering with a 100-meshed filter, the polyimide precursor is returned to the flask, 853.73 g of water and 44.97 g (504.54 millimoles) of DMAEt are added thereto, stirred at 20° C. for 12 hours to be dissolved, and the polyimide precursor is dissolved, and accordingly a polyimide precursor composition (X-3) is obtained.

A film is produced and evaluation is performed in the same manner as in Example 1. Evaluation results are shown in Table 5.

Comparative Example 4

Producing Polyimide Precursor Composition (X-4)

A polyimide precursor composition (X-4) is produced in the same manner as in Example 1, except for changing the synthesis conditions of the polyimide precursor composition to conditions disclosed in Table 1.

A film is produced and evaluation is performed in the same manner as in Example 1. Evaluation results are shown in Table 5.

Odor Inspection

Inspection of odor of the obtained polyimide precursor compositions in respective Examples is performed by ten testers A to J. The testers A to J are five men and five women who are randomly picked, and the inspection is performed by a method of choosing a sample having the worst odor with sample numbers by hiding the configurations of the samples.

The odor inspection is performed two times for an odor inspection (1) performed using two samples of the polyimide precursor compositions (A-1) and (X-1), and an odor inspection (2) performed using two samples of the polyimide precursor compositions (A-1) and (X-3). Results of each odor inspection are shown in Table 6.

TABLE 1

| | | | Example 1 | Example 2 | Example 3 | Example 4 | Example 5 |
|---|---|---|---|---|---|---|---|
| Polyimide precursor composition No. | | — | A-1 | A-2 | A-3 | A-4 | A-5 |
| Content of cyclic amine compound | | Mol % | 5 | 1 | 10 | 100 | 200 |
| Content of acyclic aliphatic amine compound | | Mol % | 100 | 100 | 100 | 100 | 100 |
| Step of combining acyclic aliphatic amine compound | | | Amine substitution step | Amine substitution step | Amine substitution step | Amine substitution step | Amine substitution step |
| Polymerization step | Tetracarboxylic dianhydride | Chemical species | BPDA | BPDA | BPDA | BPDA | BPDA |
| | | g | 72.72 | 72.72 | 72.72 | 72.72 | 72.72 |
| | | mmol | 247.16 | 247.16 | 247.16 | 247.16 | 247.16 |
| | Diamine compound | Chemical species | PDA | PDA | PDA | PDA | PDA |
| | | g | 27.28 | 27.28 | 27.28 | 27.28 | 27.28 |
| | | mmol | 252.27 | 252.27 | 252.27 | 252.27 | 252.27 |
| | Tetracarboxylic dianhydride/Diamine compound (mol ratio) | | 0.98 | 0.98 | 0.98 | 0.98 | 0.98 |
| | Solvent 1 | Chemical species | Water | Water | Water | Water | Water |
| | | g | 900 | 900 | 900 | 900 | 900 |
| | Solvent 2 | Chemical species | — | — | — | — | — |
| | | g | — | — | — | — | — |
| | Solvent 1/Solvent 2 (weight ratio) | — | 100/0 | 100/0 | 100/0 | 100/0 | 100/0 |
| | Cyclic amine compound 1 | Chemical species | MMO | MMO | MMO | MMO | MMO |
| | | g | 76.55 | 76.55 | 76.55 | 76.55 | 76.55 |
| | | mmol | 756.81 | 756.81 | 756.81 | 756.81 | 756.81 |
| | Acyclic aliphatic amine compound 1 | Chemical species | — | — | — | — | — |
| | | g | — | — | — | — | — |
| | | mmol | — | — | — | — | — |
| | State of solution | — | Dissolved state | Dissolved state | Dissolved state | Dissolved state | Dissolved state |
| Amine substitution step | Cyclic amine compound 2 | Chemical species | MMO | MMO | MMO | MMO | MMO |
| | | g | 0.13 | 2.13 | 4.64 | 49.63 | 99.63 |
| | | mmol | 1.29 | 21.06 | 45.87 | 490.66 | 984.97 |
| | Acyclic aliphatic amine compound 2 | Chemical species | DMAEt | DMAEt | DMAEt | DMAEt | DMAEt |
| | | g | 44.97 | 44.97 | 44.97 | 44.97 | 44.97 |
| | | mmol | 504.54 | 504.54 | 504.54 | 504.54 | 504.54 |
| | Additional solvent | Chemical species | Water | Water | Water | Water | Water |
| | | g | 595.27 | 593.27 | 549.53 | 545.77 | 495.77 |
| | State of solution | — | Dissolved state | Dissolved state | Dissolved state | Dissolved state | Dissolved state |
| Varnish characteristics | Solid content | % | 10 | 10 | 10 | 10 | 10 |
| | Viscosity | mPas | 15000 | 16000 | 14000 | 8000 | 4000 |
| | Imidization ratio | % | 0.02 | 0.02 | 0.02 | 0.02 | 0.02 |
| Film-forming property | Void marks | — | A | A | A | B | B |
| | Surface unevenness and patterns | — | A | A | A | B | B |

TABLE 1-continued

|  |  |  | Example 1 | Example 2 | Example 3 | Example 4 | Example 5 |
|---|---|---|---|---|---|---|---|
| Mechanical characteristics | Tensile strength | Mpa | 190 | 180 | 160 | 180 | 155 |
|  | Tensile elongation | % | 80 | 70 | 70 | 70 | 65 |
| Other characteristics | Insulating property |  | A | A | A | A | B |
|  | Pot life |  | A | A | A | A | A |

TABLE 2

|  |  |  | Example 6 | Example 7 | Example 8 | Example 9 | Example 10 |
|---|---|---|---|---|---|---|---|
| Polyimide precursor composition No. |  | — | A-6 | A-7 | A-8 | A-9 | B-1 |
| Content of cyclic amine compound |  | Mol % | 5 | 5 | 5 | 5 | 5 |
| Content of acyclic aliphatic amine compound |  | Mol % | 50 | 150 | 30 | 200 | 100 |
| Step of combining acyclic aliphatic amine compound |  | — | Amine substitution step | Amine substitution step | Amine substitution step | Amine substitution step | Polymerization step |
| Polymerization step | Tetracarboxylic dianhydride | Chemical species | BPDA | BPDA | BPDA | BPDA | BPDA |
|  |  | g | 72.72 | 72.72 | 72.72 | 72.72 | 72.72 |
|  |  | mmol | 247.16 | 247.16 | 247.16 | 247.16 | 247.16 |
|  | Diamine compound | Chemical species | PDA | PDA | PDA | PDA | PDA |
|  |  | g | 27.28 | 27.28 | 27.28 | 27.28 | 27.28 |
|  |  | mmol | 252.27 | 252.27 | 252.27 | 252.27 | 252.27 |
|  | Tetracarboxylic dianhydride/Diamine compound (mol ratio) |  | 0.98 | 0.98 | 0.98 | 0.98 | 0.98 |
|  | Solvent 1 | Chemical species | Water | Water | Water | Water | Water |
|  |  | g | 900 | 900 | 900 | 900 | 900 |
|  | Solvent 2 | Chemical species | — | — | — | — | — |
|  |  | g | — | — | — | — | — |
|  | Solvent 1/Solvent 2 (weight ratio) | — | 100/0 | 100/0 | 100/0 | 100/0 | 100/0 |
|  | Cyclic amine compound 1 | Chemical species | MMO | MMO | MMO | MMO | MMO |
|  |  | g | 76.55 | 76.55 | 76.55 | 76.55 | 2.55 |
|  |  | mmol | 756.81 | 756.81 | 756.81 | 756.81 | 25.23 |
|  | Acyclic aliphatic amine compound 1 | Chemical species | — | — | — | — | DMAEt |
|  |  | g | — | — | — | — | 44.97 |
|  |  | mmol | — | — | — | — | 504.54 |
|  | State of solution | — | Dissolved state | Dissolved state | Dissolved state | Dissolved state | Dissolved state |
| Amine substitution step | Cyclic amine compound 2 | Chemical species | MMO | MMO | MMO | MMO | — |
|  |  | g | 0.13 | 0.13 | 0.13 | 0.13 | — |
|  |  | mmol | 1.29 | 1.29 | 1.29 | 1.29 | — |
|  | Acyclic aliphatic amine compound 2 | Chemical species | DMAEt | DMAEt | DMAEt | DMAEt | — |
|  |  | g | 22.49 | 67.41 | 13.49 | 89.94 | — |
|  |  | mmol | 252.27 | 756.81 | 151.36 | 1009.08 | — |
|  | Additional solvent | Chemical species | Water | Water | Water | Water | Water |
|  |  | g | 617.75 | 572.83 | 626.75 | 550.3 | — |
|  | State of solution | — | Dissolved state | Dissolved state | Dissolved state | Dissolved state | Dissolved state |
| Varnish characteristics | Solid content | % | 10 | 10 | 10 | 10 | 10 |
|  | Viscosity | mPas | 17000 | 14000 | 18000 | 10000 | 13000 |
|  | Imidization ratio | % | 0.02 | 0.02 | 0.02 | 0.02 | 0.04 |
| Film-forming property | Void marks | — | A | A | B | B | A |
|  | Surface unevenness and patterns | — | A | A | B | B | A |
| Mechanical characteristics | Tensile strength | Mpa | 190 | 170 | 160 | 155 | 190 |
|  | Tensile elongation | % | 85 | 70 | 65 | 60 | 80 |
| Other characteristics | Insulating property |  | A | A | A | A | A |
|  | Pot life |  | A | A | A | A | A |

TABLE 3

|  |  | Example 11 | Example 12 | Example 13 |
|---|---|---|---|---|
| Polyimide precursor composition No. | — | A-10 | A-11 | A-12 |
| Content of cyclic amine compound | Mol % | 5 | 5 | 5 |
| Content of acyclic aliphatic amine compound | Mol % | 100 | 100 | 100 |

TABLE 3-continued

|  |  |  | Example 11 | Example 12 | Example 13 |
|---|---|---|---|---|---|
| Step of combining acyclic aliphatic amine compound |  | — | Amine substitution step | Amine substitution step | Amine substitution step |
| Polymerization step | Tetracarboxylic dianhydride | Chemical species | PMDA | BPDA | BPDA |
|  |  | g | 51.88 | 72.72 | 72.72 |
|  |  | mmol | 237.85 | 247.16 | 247.16 |
|  | Diamine compound | Chemical species | ODA | PDA | PDA |
|  |  | g | 48.12 | 27.28 | 27.28 |
|  |  | mmol | 240.31 | 252.27 | 252.27 |
|  | Tetracarboxylic dianhydride/Diamine compound (mol ratio) |  | 0.99 | 0.98 | 0.98 |
|  | Solvent 1 | Chemical species | Water | Water | Water |
|  |  | g | 900 | 810 | 900 |
|  | Solvent 2 | Chemical species | — | THF | — |
|  |  | g | — | 90 | — |
|  | Solvent 1/Solvent 2 (weight ratio) | — | 100/0 | 90/10 | 100/0 |
|  | Cyclic amine compound 1 | Chemical species | MMO | MMO | DMZ |
|  |  | g | 72.18 | 76.55 | 72.75 |
|  |  | mmol | 713.55 | 756.81 | 756.81 |
|  | Acyclic aliphatic amine compound 1 | Chemical species | — | — | — |
|  |  | g | — | — | — |
|  |  | mmol | — | — | — |
|  | State of solution | — | Dissolved state | Dissolved state | Dissolved state |
| Amine substitution step | Cyclic amine compound 2 | Chemical species | MMO | MMO | DMZ |
|  |  | g | 0.13 | 0.13 | 0.10 |
|  |  | mmol | 1.29 | 1.29 | 1.04 |
|  | Acyclic aliphatic amine compound 2 | Chemical species | DMAEt | DMAEt | DMAEt |
|  |  | g | 42.40 | 44.97 | 44.97 |
|  |  | mmol | 475.70 | 504.54 | 504.54 |
|  | Additional solvent | Chemical species | Water | Water | Water |
|  |  | g | 580 | 590 | 600 |
|  | State of solution | — | Dissolved state | Dissolved state | Dissolved state |
| Varnish characteristics | Solid content | % | 10 | 10 | 10 |
|  | Viscosity | mPas | 12000 | 15000 | 9000 |
|  | Imidization ratio | % | 0.02 | 0.02 | 0.06 |
| Film-forming property | Void marks | — | A | A | A |
|  | Surface unevenness and patterns | — | A | B | B |
| Mechanical characteristics | Tensile strength | Mpa | 150 | 170 | 150 |
|  | Tensile elongation | % | 50 | 70 | 50 |
| Other characteristics | Insulating property |  | A | A | A |
|  | Pot life |  | A | A | A |

TABLE 4

|  |  |  | Example 14 | Example 15 |
|---|---|---|---|---|
| Polyimide precursor composition No. |  | — | A-13 | A-14 |
| Content of cyclic amine compound |  | Mol % | 5 | 1 |
| Content of acyclic aliphatic amine compound | | Mol % | 100 | 100 |
| Step of combining acyclic aliphatic amine compound |  |  | Amine substitution step | Amine substitution step |
| Polymerization step | Tetracarboxylic dianhydride | Chemical species | BPDA | BPDA |
|  |  | g | 72.72 | 72.72 |
|  |  | mmol | 247.16 | 247.16 |
|  | Diamine compound | Chemical species | PDA | PDA |
|  |  | g | 27.28 | 27.28 |
|  |  | mmol | 252.27 | 252.27 |
|  | Tetracarboxylic dianhydride/Diamine compound (mol ratio) |  | 0.98 | 0.98 |

TABLE 4-continued

|  |  |  | Example 14 | Example 15 |
|---|---|---|---|---|
| | Solvent 1 | Chemical species | Water | Water |
| | | g | 900 | 900 |
| | Solvent 2 | Chemical species | — | — |
| | | g | — | — |
| | Solvent 1/Solvent 2 (weight ratio) | — | 100/0 | 100/0 |
| | Cyclic amine compound 1 | Chemical species | MMO | HMP |
| | | g | 76.55 | 75.03 |
| | | mmol | 756.81 | 756.81 |
| | Acyclic aliphatic amine compound 1 | Chemical species | — | — |
| | | g | — | — |
| | | mmol | — | — |
| | State of solution | — | Dissolved state | Dissolved state |
| Amine substitution step | Cyclic amine compound 2 | Chemical species | MMO | HMP |
| | | g | 0.13 | 2.09 |
| | | mmol | 1.29 | 21.06 |
| | Acyclic aliphatic amine compound 2 | Chemical species | DMAPr | DMAEt |
| | | g | 52.05 | 44.97 |
| | | mmol | 504.54 | 504.54 |
| | Additional solvent | Chemical species | Water | Water |
| | | g | 595.27 | 593.27 |
| | State of solution | — | Dissolved state | Dissolved state |
| Varnish characteristics | Solid content | % | 10 | 10 |
| | Viscosity | mPas | 15000 | 16000 |
| | Imidization ratio | % | 0.02 | 0.02 |
| Film-forming property | Void marks | — | A | A |
| | Surface unevenness and patterns | — | A | A |
| Mechanical characteristics | Tensile strength | Mpa | 190 | 180 |
| | Tensile elongation | % | 80 | 70 |
| Other characteristics | Insulating property | | A | A |
| | Pot life | | A | A |

TABLE 5

|  |  | Com. Ex. 1 | Com. Ex. 2 | Com. Ex. 3 | Com. Ex. 4 |
|---|---|---|---|---|---|
| Polyimide precursor composition No. | — | X-1 | X-2 | X-3 | X-4 |
| Content of cyclic amine compound | Mol % | 105 | 0 | 0 | 0 |
| Content of acyclic aliphatic amine compound | Mol % | 0 | 105 | 105 | 0 |
| Step of combining acyclic aliphatic amine compound | | Polymerization step | Polymerization step | Amine substitution step | — |
| Polymerization step Tetracarboxylic dianhydride | Chemical species | BPDA | BPDA | BPDA | BPDA |
| | g | 72.72 | 72.72 | 72.72 | 72.72 |
| | mmol | 247.16 | 247.16 | 247.16 | 247.16 |
| Diamine compound | Chemical species | PDA | PDA | PDA | PDA |
| | g | 27.28 | 27.28 | 27.28 | 27.28 |
| | mmol | 252.27 | 252.27 | 252.27 | 252.27 |
| Tetracarboxylic dianhydride/Diamine compound (mol ratio) | | 0.98 | 0.98 | 0.98 | 0.98 |
| Solvent 1 | Chemical species | Water | Water | NMP | NMP |
| | g | 847.79 | 853.73 | 900 | 900 |
| Solvent 2 | Chemical species | — | — | — | — |
| | g | — | — | — | — |
| Solvent 1/Solvent 2 (weight ratio) | — | — | — | — | — |
| Cyclic amine compound 1 | Chemical species | MMO | — | — | — |
| | g | 52.51 | — | — | — |
| | mmol | 519.04 | — | — | — |

TABLE 5-continued

|  |  |  | Com. Ex. 1 | Com. Ex. 2 | Com. Ex. 3 | Com. Ex. 4 |
|---|---|---|---|---|---|---|
| Amine substitution step | Acyclic aliphatic amine compound 1 | Chemical species | — | DMAEt | — | — |
|  |  | g | — | 46.27 | — | — |
|  |  | mmol | — | 519.04 | — | — |
|  | State of solution | — | Dissolved state | Not dissolved | Dissolved state | Dissolved state |
|  | Cyclic amine compound 2 | Chemical species | — | — | — | — |
|  |  | g | — | — | — | — |
|  |  | mmol | — | — | — | — |
|  | Acyclic aliphatic amine compound 2 | Chemical species | — | — | DMAEt | — |
|  |  | g | — | — | 46.27 | — |
|  |  | mmol | — | — | 519.04 | — |
|  | Additional solvent | Chemical species | — | — | — | — |
|  |  | g | — | — | — | — |
|  | State of solution | — | — | — | — | — |
| Varnish characteristics | Solid content | % | 10 | 10 | 10 | 10 |
|  | Viscosity | mPas | 10000 | — | 15000 | 20000 |
|  | Imidization ratio | % | 0.04 | — | 0.04 | 0.03 |
| Film-forming property | Void marks | — | — | D | D | A |
|  | Surface unevenness and patterns | — | — | D | D | A |
| Mechanical characteristics | Tensile strength | Mpa | 100 | — | 100 | 180 |
|  | Tensile elongation | % | 50 | — | 50 | 80 |
| Other characteristics | Insulating property | — | B | B | B | — |
|  | Pot life | — | C | C | C | — |

TABLE 6

| Tester | A | B | C | D | E | F | G | H | I | J |
|---|---|---|---|---|---|---|---|---|---|---|
| Gender | Male | Female | Male | Female | Female | Male | Female | Male | Female | Male |
| Age | 24 | 25 | 27 | 28 | 32 | 33 | 39 | 40 | 48 | 50 |
| Odor inspection (1) |  |  |  |  |  |  |  |  |  |  |
| Sample with odor | X-1 | X-1 | X-1 | X-1 | X-1 | X-1 | X-1 | X-1 | X-1 | X-1 |
| Odor inspection (2) |  |  |  |  |  |  |  |  |  |  |
| Sample with odor | X-3 | X-3 | X-3 | X-3 | X-3 | X-3 | X-3 | X-3 | X-3 | X-3 |

From the above results, it is found that the results for the evaluation of the film-forming property and the mechanical characteristics that are obtained in Examples are excellent, compared to Comparative Examples.

In addition, it is also found that the pot life is also excellent in Examples compared to Comparative Example 1, and polyimide molded articles with excellent insulating property are obtained.

It is also found that odor is suppressed even with the same combination amount of the amine compound in Examples compared to Comparative Examples.

Abbreviations in Table 1 to Table 5 are as follows. In Table 1 to Table 5, "-" means non addition or not performed.

Tetracarboxylic dianhydride
  BPDA (3,3',4,4'-tetracarboxylic dianhydride; molecular weight of 294.22)
  PMDA (pyromellitic dianhydride; molecular weight of 218.12)

Diamine Compound
  PDA (p-phenylenediamine; molecular weight of 108.14)
  ODA (4,4'-diaminodiphenyl ether; molecular weight of 200.24)

Cyclic Amine Compound
  MMO (methylmorpholine; molecular weight of 101.15)
  EMO (ethylmorpholine; molecular weight of 115.17)
  DMZ (1,2-dimethylimidazole; molecular weight of 96.13)
  HMP (4-hydroxymethyl piperidine)

Acyclic Aliphatic Amine Compound
  DMAEt (dimethylaminoethanol; molecular weight of 89.14)
  DMAPr (dimethylaminopropanol)

Solvent
  THF (tetrahydrofuran)

Example A

After spin-coating the polyimide precursor composition (A-1) to an electrode surface of an ITO electrode-attached glass substrate, and drying the surface at 60° C. for 10 minutes, burning is performed at 250° C. for 30 minutes to forma polyimide film having a thickness of 70 nm, and rubbing treatment is performed on the surface thereof. Accordingly, a liquid crystal alignment film formed of a polyimide film is formed on the electrode surface of the ITO electrode-attached glass substrate.

A pair of the ITO electrode-attached glass substrates on each of which this liquid crystal alignment film is formed, are produced, and the pair of substrates are superimposed onto each other so that rubbing directions are orthogonal to each other and liquid crystal alignment films oppose each other through a spacer. After injecting liquid crystal "WLC-2003 (manufactured by Merck KGaA)" into a gap of the liquid crystal alignment films, surroundings of the pair of substrates are sealed, and a liquid crystal cell is produced.

When alignment states of the obtained liquid crystal cell are observed with a polarizing microscope, alignment of liquid crystals is confirmed.

In addition, liquid crystal cells are produced in the same manner as described above, using the polyimide precursor compositions (A-2) to (A-14) and (B-1) instead of the polyimide precursor composition (A-1), and alignment of liquid crystals are confirmed in the obtained liquid crystal cells.

Example B

A flexible wiring board on which a copper-foiled wire pattern is formed, is prepared on a polyimide resin substrate. After performing printing coating of the polyimide precursor composition (A-1) on a wire surface of the flexible wiring board and drying the surface at 60° C. for 10 minutes, burning is performed at 250° C. for 30 minutes, and a polyimide film having a thickness of 5 is formed. Accordingly, a passivation film (interlayer insulating film) formed of the polyimide film is formed on the wire surface of the flexible wiring board.

When a continuity test is performed between the wire pattern and the passivation film on the passivation film-attached flexible wiring board, it is confirmed that they are not electrically connected to each other and the passivation film functions as an insulating coating film.

When passivation film-attached flexible wiring boards are produced in the same manner described above using the polyimide precursor compositions (A-2) to (A-14) and (B-1) instead of the polyimide precursor composition (A-1), it is confirmed that the passivation film functions as an insulating coating film.

Example C

After performing cast coating of the polyimide precursor composition (A-1) on an aluminum foil surface to have a thickness of 350 μm, the formed coated film is dried at 60° C. for 10 minutes. The obtained dried film is peeled off from the aluminum foil, and burning is performed at 250° C. for 30 minutes in a state of being fixed to a frame, and a polyimide film having a thickness of 25 μm is produced.

A tetrafluoroethylene-hexafluoropropylene copolymer aqueous coating material (EPA aqueous dispersion) is applied to both surfaces of the obtained polyimide film, the surface thereof is dried at 150° C. for 1 minute and burned at 415° C. for 15 seconds, and a fluorine resin layer (heat-sealed layer) having a thickness of 25 μm is formed. A polyimide film laminated on which this fluorine resin layer is formed is processed into a tape shape, and an electric wire coating tape is produced. The obtained electric wire coating tape is wound around a copper electric wire, heating treatment is performed to melt the fluorine resin layer (heat-sealed layer) of the electric wire coating tape, to heat-seal the electric wire coating tape on the electric wire.

When a continuity test is performed between the electric wire and the electric wire coating tape on the electric wire coating tape-attached electric wire, it is confirmed that they are not electrically connected to each other and the electric wire coating tape functions as an insulating coating film.

When electric wire coating tape-attached electric wires are produced in the same manner described above using the polyimide precursor compositions (A-2) to (A-14) and (B-1) instead of the polyimide precursor composition (A-1), it is confirmed that the electric wire coating tape functions as an insulating coating film.

Example D

The polyimide precursor composition (A-1) is spin-coated on the surface of a polyimide film. Next, another polyimide film is superimposed on a coated film formation surface of the polyimide film. Then, in this state, after drying the coated film of the polyimide precursor composition (A-1) at 60° C. for 10 minutes and performing burning thereof at 250° C. for 30 minutes, a polyimide film having a thickness of 70 μm is formed.

When attempting to peel off one polyimide film from a laminate of the obtained polyimide film, it is confirmed that it is not easily peeled off and the polyimide film formed between two polyimide films functions as an adhesive film.

When laminates of polyimide films are produced in the same manner described above using the polyimide precursor compositions (A-2) to (A-14) and (B-1) instead of the polyimide precursor composition (A-1), it is confirmed that a polyimide film formed between two polyimide films functions as an adhesive film.

From Examples 1 to 15 and Examples A to D described above, it is found that various polyimide molded articles (the liquid crystal alignment film, the passivation film, the electric wire coating tape (wire coating material), and the adhesive film) having high mechanical strength are obtained from the polyimide precursor compositions of Examples 1 to 15. It is found that various polyimide molded articles have a high film-forming property and excellent surface property.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide precursor composition comprising a resin having a repeating unit represented by the following Formula (I) and having an imidization ratio equal to or less than 0.2, a cyclic tertiary amine compound, and an acyclic aliphatic tertiary amine compound, wherein the resin, the cyclic tertiary amine compound, and the acyclic aliphatic tertiary amine compound are dissolved in an aqueous solvent:

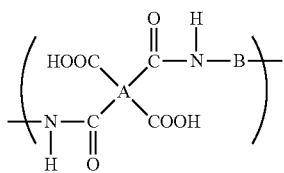

wherein in Formula (I), A represents a tetravalent organic group and B represents a divalent organic group, and
  wherein the molar ratio of the cyclic tertiary amine compound to the acyclic aliphatic tertiary amine compound is from 1:100 to 200:100.

2. The polyimide precursor composition according to claim 1, wherein the cyclic tertiary amine compound is at least one kind of compound selected from the group consisting of pyridines, imidazoles, morpholines, piperidines, piperazines, pyrrolidines, and pyrazolidines.

3. The polyimide precursor composition according to claim 1, wherein the resin is synthesized from aromatic tetracarboxylic dianhydride and an aromatic diamine compound.

4. The polyimide precursor composition according to claim 1, wherein the resin includes an amino group on a terminal end of the polyimide precursor.

5. A method of producing the polyimide precursor composition according to claim 1, the method comprising: polymerizing tetracarboxylic dianhydride and a diamine compound in an aqueous solvent in the presence of a cyclic tertiary amine compound and an acyclic aliphatic tertiary amine compound, to form a resin.

6. A method of producing the polyimide precursor composition according to claim 1, the method comprising: polymerizing tetracarboxylic dianhydride and a diamine compound in an aqueous solvent in the presence of a cyclic tertiary amine compound to form a resin and then mixing the aqueous solvent including the formed resin and an acyclic aliphatic tertiary amine compound with each other, or mixing the formed resin, an aqueous solvent, and an acyclic aliphatic tertiary amine compound with each other.

7. A method of producing a polyimide molded article, comprising molding the polyimide precursor composition according to claim 1 by heat treatment.

8. A polyimide molded article produced by the method of producing a polyimide molded article according to claim 7.

9. A liquid crystal alignment film formed of a polyimide molded article produced by the method of producing a polyimide molded article according to claim 7.

10. A passivation film formed of a polyimide molded article produced by the method of producing a polyimide molded article according to claim 7.

11. A wire coating material formed of a polyimide molded article produced by the method of producing a polyimide molded article according to claim 7.

12. An adhesive film formed of a polyimide molded article produced by the method of producing a polyimide molded article according to claim 7.

13. The polyimide precursor composition according to claim 1, wherein the molar ratio of the cyclic tertiary amine compound to the acyclic aliphatic tertiary amine compound is from 1:100 to 10:100.

* * * * *